(12) United States Patent
Brussard et al.

(10) Patent No.: US 7,393,034 B2
(45) Date of Patent: Jul. 1, 2008

(54) MOVEABLE STRIP DOOR SUSPENSION SYSTEM

(75) Inventors: Thomas E. Brussard, Melrose, MA (US); Tim A. Swager, Fremont, IN (US); Geoffrey Fisher, Fremont, IN (US)

(73) Assignee: Brussard Associates, Inc., Melrose, MA (US)

( * ) Notice: Subject to any disclaimer, the term of this patent is extended or adjusted under 35 U.S.C. 154(b) by 0 days.

(21) Appl. No.: 11/651,856

(22) Filed: Jan. 10, 2007

(65) Prior Publication Data

US 2008/0012371 A1 Jan. 17, 2008

Related U.S. Application Data

(63) Continuation-in-part of application No. 11/486,679, filed on Jul. 14, 2006.

(51) Int. Cl.
*B60N 3/00* (2006.01)
(52) U.S. Cl. ..................... 296/24.41; 16/35 R
(58) Field of Classification Search .............. 296/24.41, 296/24.43, 37.16; 410/118, 129, 100, 94
See application file for complete search history.

(56) References Cited

U.S. PATENT DOCUMENTS

| | | | |
|---|---|---|---|
| 1,428,932 A * | 9/1922 | Bayer ................. 16/35 R |
| 1,687,631 A * | 10/1928 | Oberwegner ............. 16/34 |
| 1,716,867 A | 6/1929 | Sims .................. 410/129 |
| 1,780,765 A | 11/1930 | O'Connor ............... 410/129 |
| 1,896,198 A | 2/1933 | MacMillan .............. 410/129 |
| 1,917,866 A | 7/1933 | Wood ................... 62/166 |
| 2,240,149 A * | 4/1941 | Seyfried ............... 16/35 R |
| 2,324,721 A | 7/1943 | O'Connor .............. 410/130 |
| 2,502,192 A | 3/1950 | Williamson ............. 62/118 |
| 2,536,241 A | 1/1951 | Williamson ............. 62/168 |
| 2,633,714 A * | 4/1953 | Wehby ................... 62/62 |
| 2,725,827 A | 12/1955 | Wehby ................ 296/24.41 |
| 2,775,313 A * | 12/1956 | Kurvers et al. ........... 188/2 R |
| 2,782,846 A | 2/1957 | Bussard ............... 296/24.35 |
| 2,866,419 A | 12/1958 | Candlin ................ 410/135 |
| 2,900,659 A * | 8/1959 | Snell ................... 16/35 R |
| 2,934,372 A | 4/1960 | Jewell ................. 296/186.1 |
| 2,942,290 A * | 6/1960 | Segal .................. 16/35 R |
| 3,017,842 A * | 1/1962 | Nampa ................ 410/133 |
| 3,162,146 A | 12/1964 | Knippel ............... 410/131 |
| 3,217,664 A | 11/1965 | Aquino ................ 410/131 |
| 3,235,926 A | 2/1966 | Mates ................... 24/306 |
| 3,298,143 A * | 1/1967 | Rogers et al. .............. 52/64 |
| 3,348,632 A | 10/1967 | Swager ................ 182/230 |

(Continued)

OTHER PUBLICATIONS http://www.envirobarrier.com/proCat/img_stripDoors/stripDoorPics.php, 3 pgs.

(Continued)

*Primary Examiner*—Kiran B. Patel
(74) *Attorney, Agent, or Firm*—Sullivan & Worcester LLP

(57) ABSTRACT

The present invention relates to movable barrier systems, such as a strip door suspension systems, that can be repositioned along the length or width of a room, container, or vehicle, for example, that is temperature controlled. The system saves energy, keeps cargo at a constant temperature, and is safe to the operator.

20 Claims, 8 Drawing Sheets

U.S. PATENT DOCUMENTS

| | | | | |
|---|---|---|---|---|
| 3,632,154 | A | | 1/1972 | Woodrich ................ 296/24.41 |
| 3,638,450 | A | * | 2/1972 | Falk ............................ 62/329 |
| 3,680,492 | A | | 8/1972 | Weage ........................ 410/129 |
| 3,767,253 | A | * | 10/1973 | Kluetsch ..................... 410/118 |
| 4,049,311 | A | * | 9/1977 | Dietrich et al. ............. 410/138 |
| 4,221,421 | A | | 9/1980 | Bettker, Jr. et al. ............ 296/24 |
| 4,276,752 | A | | 7/1981 | Modler et al. ................. 62/166 |
| 4,288,992 | A | | 9/1981 | Eliason ........................ 62/256 |
| 4,296,792 | A | | 10/1981 | Gidge et al. ................. 160/332 |
| 4,313,485 | A | | 2/1982 | Gidge et al. ................. 160/328 |
| 4,340,106 | A | * | 7/1982 | Van Horn, II ............... 160/332 |
| 4,384,606 | A | | 5/1983 | Johnston et al. ............. 160/332 |
| 4,392,360 | A | | 7/1983 | Gidge et al. ................. 62/249 |
| 4,420,027 | A | | 12/1983 | Gidge et al. ................. 160/328 |
| 4,515,202 | A | | 5/1985 | Wilson ........................ 160/332 |
| 4,550,760 | A | | 11/1985 | Gidge et al. ................. 160/328 |
| 4,575,896 | A | * | 3/1986 | Nakao et al. ................. 16/35 R |
| 4,621,856 | A | * | 11/1986 | McKenzie ................. 296/24.4 |
| 4,639,031 | A | * | 1/1987 | Truckenbrodt ........... 296/24.41 |
| 4,776,382 | A | | 10/1988 | Rooswinkel ................. 160/332 |
| 4,938,518 | A | * | 7/1990 | Willemsen ................ 296/24.41 |
| 5,127,460 | A | | 7/1992 | Abadi et al. ................. 160/332 |
| 5,238,084 | A | | 8/1993 | Swager ........................... 182/8 |
| 5,238,282 | A | | 8/1993 | Watson .................... 296/24.41 |
| 5,554,088 | A | * | 9/1996 | Zlojutro ........................ 482/83 |
| 5,704,676 | A | | 1/1998 | Hill ......................... 296/24.35 |
| 5,915,659 | A | * | 6/1999 | Scannell, Jr. ................ 248/371 |
| 6,247,740 | B1 | | 6/2001 | Smith ........................ 296/24.1 |
| 6,364,388 | B1 | | 4/2002 | Ziegler ..................... 296/24.35 |
| 6,453,508 | B1 | * | 9/2002 | Denner ........................ 16/35 R |
| 6,626,625 | B2 | | 9/2003 | Nelson et al. ............... 410/130 |
| 6,629,807 | B2 | * | 10/2003 | Bernardo .................... 410/132 |
| 6,751,969 | B1 | | 6/2004 | Moran et al. .................. 62/177 |
| 6,854,567 | B2 | * | 2/2005 | Suzuki ...................... 188/1.12 |
| 6,923,610 | B2 | | 8/2005 | Nelson et al. ............... 410/130 |
| 6,941,999 | B2 | | 9/2005 | Paterni ....................... 160/184 |
| 7,011,132 | B2 | | 3/2006 | Robbins, III ............... 160/332 |
| 7,195,435 | B2 | * | 3/2007 | Clark ......................... 410/135 |
| 7,281,720 | B1 | * | 10/2007 | Richards .................... 280/79.5 |
| 2003/0217887 | A1 | | 11/2003 | Thomas et al. .................. 182/8 |
| 2007/0085301 | A1 | * | 4/2007 | Watkins ...................... 280/642 |

OTHER PUBLICATIONS

Stewart, "Big Rig Basics—Keeping Your Cool", http://www.writerstew.com/ws50.htm, 10 pgs.

"The Swinger—Swings Out of the Way of Traffic", http://www.randallmfg.com/curtains/stripswinger.html, 1 pg.

Glace-Guard Cold Storage Doors, 12 pgs.

Kason, Strip Curtain System, Truck Body, p. 1-25, 1 pg.

Koke Inc. Order Picker™ Catalog, 3 pgs., 2005.

Climber's Buddy™ Safety Rail and Ladder Systems, http://www.surloc.com/products/climbersbuddy.html, 5 pgs.

Removable Truck/Trailer Save-T Strip Door with Swivel Mount, 2 pgs., 1993.

* cited by examiner

MOVEABLE STRIP DOOR SUSPENSION SYSTEM

RELATED APPLICATION

This application is a continuation-in-part application of U.S. patent application Ser. No. 11/486,679, filed Jul. 14, 2006, the entire disclosure of which is hereby incorporated by reference.

FIELD OF THE INVENTION

The invention relates to moveable strip door suspension systems and methods that provide a barrier that moves along a rail and a roller track in a room or vehicle. The barrier may be positioned and releasably locked into position at any point along the rail/roller track system. In an embodiment, the barrier is a thermal barrier or insect barrier, for example.

BACKGROUND OF THE INVENTION

Storing, transporting and delivering refrigerated goods requires the use of a room or vehicle equipped with a refrigeration or freezer unit or other means of cooling the air within the room or vehicle sufficiently to protect the cargo. One of the most obvious examples of such cargo is refrigerated or frozen foods or medical supplies which, if allowed to warm or thaw, are no longer useable or saleable.

If a vehicle is fully loaded at a single loading site and transported to an unloading site where it is fully unloaded, problems with respect to maintaining a sufficiently cool temperature are not necessarily encountered. However, when a vehicle is not fully loaded and/or is loaded at multiple loading sites and/or unloaded at multiple unloading sites, the risk of loss of refrigeration or increased expense for maintaining a proper refrigeration temperature increases. As delivery proceeds, the vehicle becomes partially emptied. This means that the refrigeration unit then cools not only the remaining cargo, but the empty portion of the vehicle. Each time the vehicle doors are opened and cargo is removed, cool air is lost and the warmer air that replaces it must then be cooled in order to protect the remaining cargo. As a consequence, cargo that is loaded first is also the cargo that is unloaded last and is thus subjected to the full effect of the warming and cooling cycles caused by repeatedly opening and closing the vehicle doors.

One approach to maintaining the cooling capacity of a refrigerated vehicle has been to provide a movable bulkhead that can be repositioned along the vehicle's length. The bulkhead is used to close off that portion of the vehicle that still contains refrigerated goods. However, rigid bulkheads are expensive, complex, difficult to position, heavy, and must be moved each time the goods contained behind them are loaded or unloaded. While some such bulkheads have doors that can be opened, a majority of bulkheads are solid and it is impossible to see precisely what is behind them without first moving them. Further, known bulkheads in the art feature heavy mounting hardware, and are hinged such that the entire bulkhead is lifted and then positioned along the roof of the vehicle when not in use. Such doors are difficult to repair and represent a potential safety hazard should the door hardware fail.

Strip curtains that span the width of a vehicle make it possible for a person to walk through the curtain without having to move it to one side and facilitate the on-loading and off-loading of cargo. However, where goods must be loaded in bulk, such as by forklift truck, it becomes extremely desirable to provide a way for the curtain to be moved from its position stretching across the load space to enable free access to the cargo or the cargo space. Without an easily operated structure to enable the movement of such a curtain along the vehicle length and across the vehicle width there is a tendency for the operator to use the strip curtain improperly.

Another approach to providing temperature control is a curtain or door, fashioned either from overlapping vinyl strips or insulating "blankets" consisting of fabric sandwiched around an insulating core. The strips or blankets are secured along a horizontally extending overhead member. Vinyl strips are made of lightweight translucent or transparent vinyl material, allowing the cargo behind the strips to be seen, while avoiding the storage and manipulation problems inherent in the use of heavy, rigid bulkheads. Such strip curtains have been modified for use in vehicles by providing a horizontally extending aluminum support member from which the individual strips are suspended, and a track-and-trolley extending along the upper walls of the vehicle proximate the roof, whereby the horizontally extending support member can be positioned at various specific sites along the length of the vehicle (see, for example, U.S. Pat. No. 4,639,031 to Truckenbrodt). However, that patent discloses a locking system that can only engage with a series of holes placed at set intervals along the rail system it employs. In addition, the operator must undo the lock on one end of the system and pivot the system in order to move it to a different position in the vehicle. Such pivoting is difficult and dangerous if the operator is moving the system to the rear of a vehicle, because it requires the operator to leave the vehicle and step onto the ground, a docking board, scissor lift, or fork lift, thereby posing a safety issue. Another type of strip door, such as that manufactured by Kason Industries, is stationary and cannot be moved forward or backward inside a vehicle. Yet another system used in the past involves the permanent installation of a horizontal support member to the vehicle wall at a hinge which allows the strip curtain to be stored along the side wall of the vehicle, but does not allow the curtain to be repositioned along the length of the vehicle.

Accordingly, the need exists for a lightweight, ergonomically designed, low maintenance, and flexible thermally insulating barrier that may be positioned at any point along the length of a vehicle, thereby varying the air space required to be cooled, while at the same time providing structure that enables the barrier to be moved to a loading or storage position along side one of the trailer's side walls.

SUMMARY OF THE INVENTION

The present invention relates to movable barrier systems that can be repositioned along the length or width of a room, building, container, or vehicle, for example, a truck, trailer, railroad car, aircraft hold, cart, or van. In an embodiment, the room, building, container, or vehicle is temperature controlled (e.g., refrigerated, freezing, or heated). The movable barrier systems and methods do not require pivoting of the barrier to reposition it, thereby making it safer and allowing the operator to stand within the trailer, for example, even when moving the barrier system to the rear of the vehicle. In addition, the movable barrier system provides a wider and higher insulated cargo space.

In one aspect, the invention provides movable barrier systems extendable between two side walls. The systems includes a barrier, a transverse bar engaged with the barrier such that the barrier extends between the two side walls, one end of the transverse bar moveably engaged with a first support and a second end of the transverse bar moveably engaged with a second support. The system further comprises a releasable locking mechanism engaged with the first end of the transverse bar and the first support such that the locking mechanism can lock onto the first support, for example, by clamping it. In an embodiment, the releasable locking mechanism can lock onto the first support at any point as it travels along the first support. In an embodiment, the transverse bar is moveable along the first and second support without the need to disengage it therefrom in order to move the barrier.

In an embodiment, the barrier is a thermal barrier (e.g., refrigeration or heat), such as a strip door or curtain; however any desired barrier, such as an insect barrier, is contemplated. In an embodiment, the barrier is formed from a plurality of strips, for example, thermoplastic sheeting or mesh. The barrier may be made of any suitable material, e.g., poly vinyl chloride, vinyl, and insulating fabric.

In an embodiment, the first support comprises a rail, such as an I or T rail, extending along the first side wall.

In an embodiment, the second support comprises a roller track extending along the second side wall. In an embodiment, the barrier system of the invention comprises a transverse bar that is engaged with a roller assembly that engages with the roller track. The roller assembly comprises at least one wheel.

In an embodiment, the locking mechanism comprises a moving member for releasing the locking mechanism. The release handle may be, for example, a wand, twist rod, chain, or rope.

BRIEF DESCRIPTION OF THE DRAWINGS

The foregoing and other objects, features and advantages of the present invention, as well as the invention itself, will be more fully understood from the following description of preferred embodiments when read together with the accompanying drawings, in which.

DETAILED DESCRIPTION OF THE INVENTION

Figure 1:
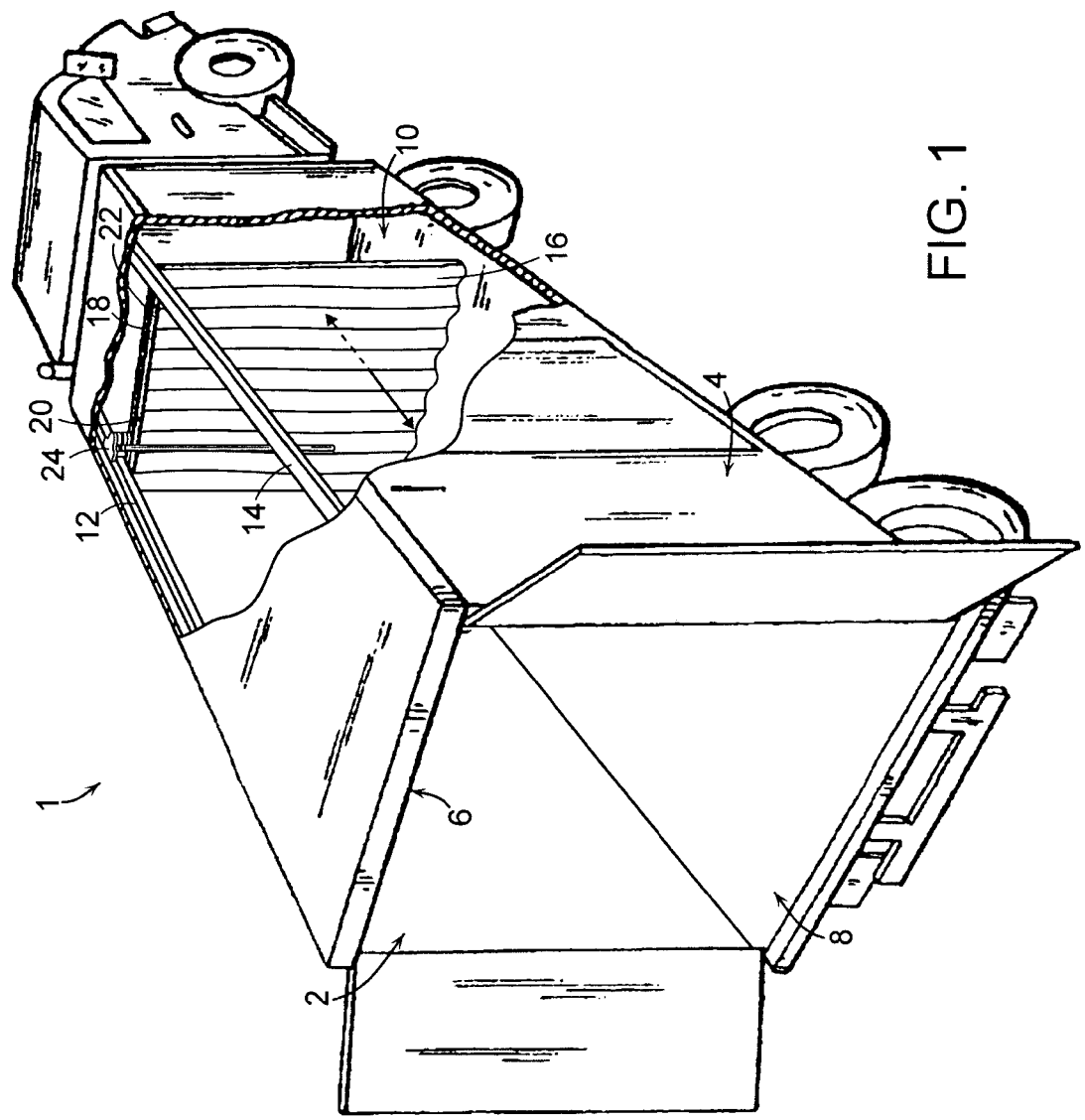
FIG. 1 provides a perspective view of moveable strip door suspension system mounted on a trailer's side walls according to an embodiment of the invention.

FIG. 1 shows an embodiment of the invention comprising a trailer truck 1 with a temperature control unit (not specifically shown) for keeping the interior of the trailer truck 1 at a uniform temperature (e.g., cool or hot). The trailer truck 1 has a left (first) side wall 2, a right (second) side wall 4, a ceiling 6, and a floor 8. As shown in FIG. 1, a moveable strip door suspension system 10 according to one embodiment of the invention is installed therein. The system 10 comprises a first support 12 disposed on the left side wall 2, a second support 14 disposed on the right side wall 4, a strip door 16 attached to a transverse bar 18, having a first end 20 and a second end 22, disposed there between, and a releasable locking mechanism 24 for locking the transverse bar 18 in a desirable place along the first and second supports 12, 14. The transverse bar 18 is moveable in both the forward and backward directions and can be locked in place using the releasable locking mechanism 24, and unlocked and moved as desired.

Figure 2:
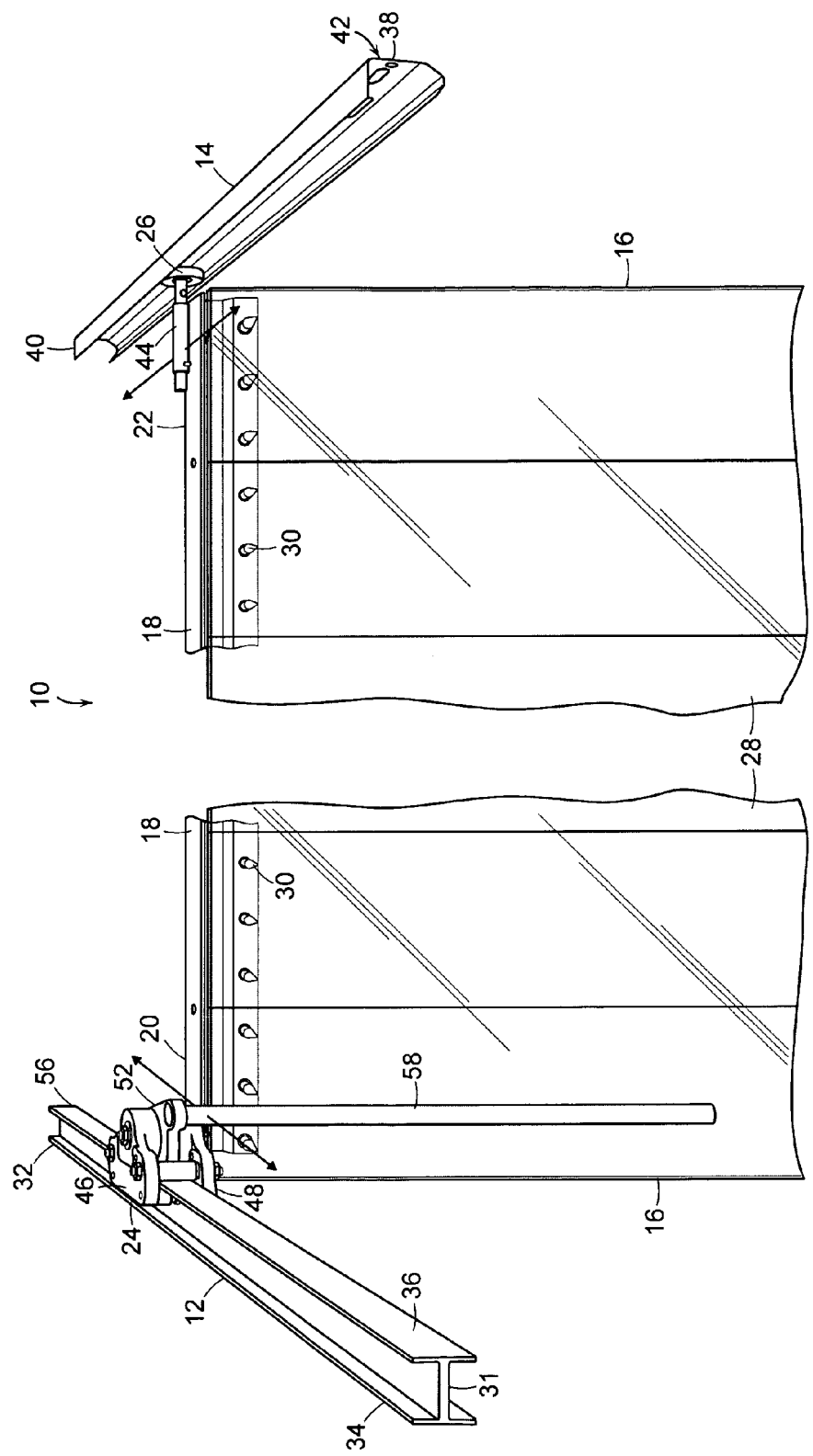
FIG. 2 provides a perspective view of a moveable strip door suspension system according to an embodiment of the invention.

Referring now to FIG. 2, the first support 12 is arranged in a fixed parallel spatial relationship with the second support 14, along the left and right side walls 2, 4. In an embodiment, the first support 12 is an I rail and the second support 14 is a roller track. As shown in FIG. 1, in an embodiment, the first and second supports 12, 14 are placed proximal to the ceiling 6, such that the amount of temperature controlled (e.g., cool) air escaping over the strip door 16 is minimized. If desired, additional strip door material or other suitable barrier (not shown) can be attached to the transverse bar 18 or strip door 16 such that it extends upward toward the ceiling 6 to further block the escape of temperature controlled air from the temperature controlled section of the trailer truck 1.

The first support 12 may be any suitable shape for allowing traversal by a releasable locking mechanism 24. In certain embodiments, the first support 12 may be an I rail, a T rail, beam, cable, or the like. The first support 12 may be made of any suitably rigid material that can withstand the weight and movement stresses of the strip door 16, for example, metal (e.g., aluminum, stainless steel, galvanized steel, HTP®), plastic, fiberglass, poly vinyl chloride, or the like. In an embodiment, the first support 12 further comprises apertures for bolting or screwing the first support 12 to the left side wall 2 (not shown).

The second support 14 may be any suitable shape for allowing traversal by a roller 26 attached to the transverse bar 18. In certain embodiments, the second support 14 may be a C rail. In other embodiments, the second support 14 is a trolley selected from a flat trolley or an eye manual trolley (e.g., as sold by Vestil Manufacturing Corporation, Angola, Ind.) or a track or the like, such as those sold by Richards-Wilcox, Inc. (Aurora, Ill.). The second support 14 may be made of any suitably rigid material that can withstand the weight and movement stresses of the strip door 16, for example, aluminum, stainless steel, galvanized steel, HTP®, plastic, fiberglass, poly vinyl chloride, or the like. In an embodiment, the second support 14 further comprises holes for bolting or screwing the second support 14 to the right side wall 4.

In another embodiment, the orientation of the moveable strip door suspension system 10 is reversed such that the first support 12 is secured to the right side wall 4 and the second support 14 is secured to the left side wall 2. Alternatively, the moveable strip door suspension system 10 is positioned along the length of the vehicle 1, for example, if the door is located on the side of the vehicle.

The strip door 16 may be attached to the transverse bar 18 by any number of securing means. FIG. 2 shows an embodiment of the invention in which the strip door 16 comprises a number of strips 28 that are attached to the transverse bar 18 by a plurality of bullet shaped members 30, for example, as in the Maximus System™ or MaxBullet™ mounting hardware sold by Aleco Corp. (Muscle Shoals, Ala.). Any alternative attachment is contemplated, including hooks, buttons, staples, rings, nuts and bolts, welded studs, or the like. The transverse bar 18 may be made of any suitably rigid material that can withstand the weight and movement stresses of the strip door 16, for example, aluminum, stainless steel, galvanized steel, HTP®, plastic, fiberglass, poly vinyl chloride, or the like.

The strips 28 and strip door 16 may be any desired width or length to span a desired space. For example, the strips 28 may be about 2, about 4, about 6, about 8, about 10, about 12, about 14, about 16, about 20, about 25, about 30, about 35, about 40, about 45, about 50, about 55, about 60, about 65, about 70, about 75, about 80, about 85, about 90, about 95, about 100, inches in width or any width there between. The strips 28 may be any suitable length depending on the height of the room, container or vehicle, for example, about 2 feet, about 4 feet, about 6 feet, about 8 feet, about 10 feet, about 12 feet, about 14 feet, about 16 feet, or any length there between.

The strips 28 may be made of any useful thermal material, such as, for example, polyvinylchloride, vinyl, vinyl coated fabric, high mass vinyl, pre-coated woven vinyl coated mesh polyester screen, and insulating fabric, and may be clear, opaque, or any desired color, texture, or dimensions. The strips 28 may be any desired thermally insulating thickness, for example, about 0.040, about 0.050, about 0.10, about 0.15, about 0.20, about 0.25, about 0.30, about 0.35, about 0.40, about 0.45, or about 0.50 mm or any thickness there between. Suitable strip 28 material includes, for example, Clear-Flex II®, Hi-Viz®, and Scratch Guard® by Aleco Corp. (Muscle Shoals, Ala.) or Standard Smooth, USDA Low-Temp Smooth, USDA Low-Temp Reinforced, Anti-Static, Weld Screen, Opaque, Safety Orange, X-Low-Temp sold by Kason Industries, Inc. (Lynbrook, N.Y.) or strip doors such as Save-T® sold by TMI Inc. (Pittsburgh, Pa.), Verilon® Vinyl (Wheeling, Ill.), or those sold by Singer Safety Co. (Chicago, Ill.), Wilson Industries (Pomona, Calif.), or Strip-Curtains.com (Point Roberts, Wash.), for example. Alternatively, the strips 28 or strip door 16 may be comprised of a material (e.g., mesh strips) that keeps insects out of a portion of the trailer 1. In an embodiment, the insect strips 28 are mesh strips made of pre-coated woven vinyl coated mesh polyester screen, such as Air-Flex® sold by Aleco Corp. (Muscle Shoals, Ala.).

Referring again to FIG. 2, an embodiment of the movable strip door suspension system 10 is shown in more detail. In an embodiment, the first support 12 is I shaped and comprises a first end 31 and a second end 32 comprising a first side 34 and a second side 36. The first side 34 of the first support 12 is placed against the left side wall 2 and the second side 36 engages with the releasable locking mechanism 24. The second support 14 is C shaped and comprises a first end 38 and a second end 40 and a side 42 that is placed against the right side wall 4. The second support 14 is engaged with a roller 26, for example, such as the rollers sold by Action Industries (Cleveland, Ohio). In an embodiment, the roller 26 may be a utility hanger, caged roller bearing, ball bearing, or the like, such as those sold by Richards-Wilcox, Inc. (Aurora, Ill.). The roller 26 is rotatably engaged with a bracket 44 that is attached to the second end 22 of the transverse bar 18 and the first end 20 of the transverse bar 18 is attached to the releasable locking mechanism 24.

Figure 3:
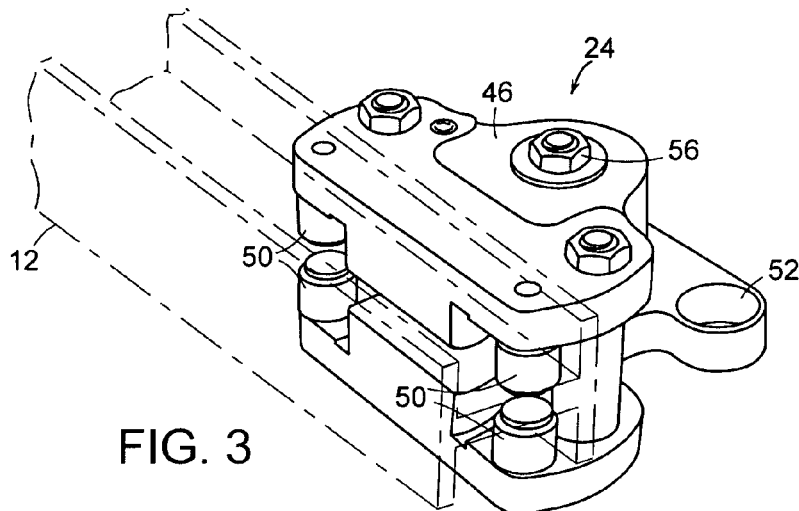
FIG. 3 provides a perspective view of the releasable locking mechanism according to an embodiment of the invention.

Referring now to FIG. 3, in an embodiment of the invention, the releasable locking mechanism 24 clamps onto the first support 12 and is moveable anywhere along the first support 12 between the ends 31, 32. In an embodiment, the releasable locking mechanism 24 is a brake mechanism such as those described in U.S. Pat. Nos. 3,348,632 and 5,238,084 to Swager relating the Climber's Buddy™ sold by Sur Loc, Inc. (Fremont, Ind.) and US Patent Application Ser. No. 20030217887 to Thomas. The releasable locking mechanism 24 may be spring-biassed into frictional engagement with the first support member 12. The releasable locking mechanism 24 may be a clamp, such as a girder clamp, a universal superclamp, a swivel or fixed jaw adjustable girder clamp, for example (i.e., as sold by Fastenal, Winona, Minn.), or the like, or other clip, cam, or lock that can move along a track and lock in place along the track.

Figure 4A:
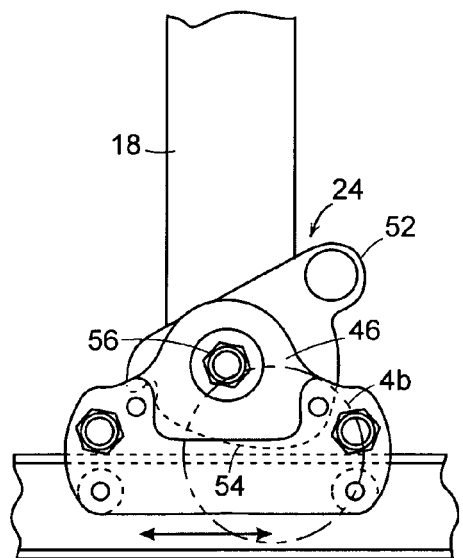
FIG. 4a provides a top view of the releasable locking mechanism in an open position according to an embodiment of the invention.
Figure 5A:
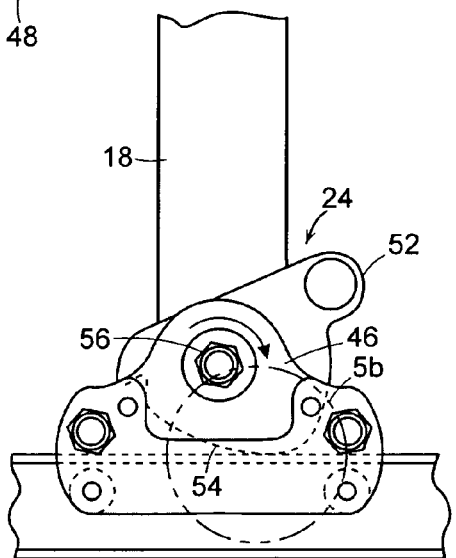
FIG. 5a provides a top view of the releasable locking mechanism in a closed position according to an embodiment of the invention.
Figure 4B:
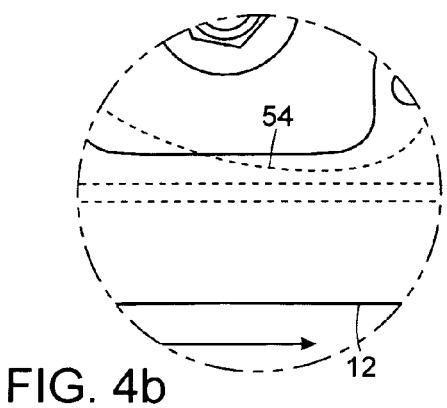
FIG. 4b provides a close up of the cam portion of the releasable locking mechanism of FIG. 4a in an open position according to an embodiment of the invention.
Figure 5B:
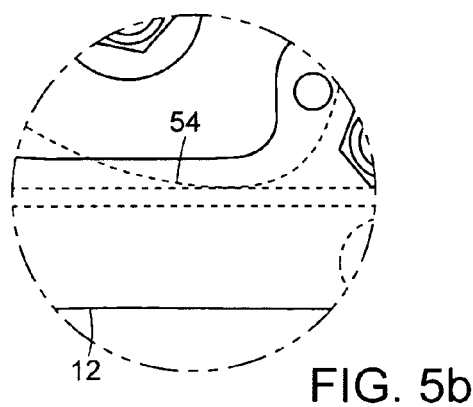
FIG. 5b provides a close up of the cam portion of the releasable locking mechanism of FIG. 5a in a closed position according to an embodiment of the invention.

Referring to FIGS. 3-5b, in an embodiment of the invention, the releasable locking mechanism 24 comprises side plates 46, 48, between which are disposed rollers 50 and a locking arm 52 comprising a cam 54. The rollers 50 and the locking arm 52 of the releasable locking mechanism 24 are spaced to engage an H rail 12 and to allow for locking engagement with the cam 54. In an embodiment, a spring (not shown) is mounted on each side of locking arm 52, biasing the cam 54 against the H rail 12. A bolt 56 passes through the side plates 46, 48 to secure the releasable locking mechanism 24 to the transverse bar 18. FIGS. 4a and 4b show a releasable locking mechanism 24 in the open position, in which the cam 54 is not pressing against the H rail 12, and can be moved along the H rail 12 in either direction. FIGS. 5a and 5b show the releasable locking mechanism 24 in the locked position, in which the cam 54 is engaged with and locked against the H rail 12.

Referring again to FIG. 2, in an embodiment, the releasable locking mechanism 24 further comprises a moving member 58 for use by the operator to grasp and push or pull to open and close the releasable locking mechanism 24. In an embodiment, the moving member 58 is a wand, a twist rod, a chain, or a rope, for example. In another embodiment, the moving member 58 is a cargo bar or cargo strap that is already in the trailer for keeping the trailer contents securely in place (e.g., those sold by Vestil Manufacturing Corp., Angola, Ind.). The moving member 58 is useful for moving the strip door 16 forward and backward along the first and second supports 12, 14.

Referring now to FIGS. 1-3, the strip door 16 is initially positioned at a desired location within a vehicle 1, with transverse bar 18 secured to the first support 12. When it is desired to move the transverse bar 18 along the length of vehicle 1, the releasable locking mechanism 24 is opened by moving the locking arm 52 either by hand or using a moving member 58, for example. While holding the locking arm 52 in the open position as shown in FIGS. 4a and 4b, the releasable locking mechanism 24 may be moved along the first support 12 and second support 14 to a second desired position, where the locking arm 52 is released and locks in place (FIGS. 5a and 5b). The strip door 16 can be moved with minimum force, allowing a user to move the strip door 16 closer to the goods requiring refrigeration, freezing, or heating. In another embodiment, the releasable locking mechanism 24 is moved along the first support 12 pneumatically, according to art known methods, by operation either directly on or around the moveable strip door suspension system 10, or remotely, e.g., in the cab of a truck by the driver.

Figure 6:
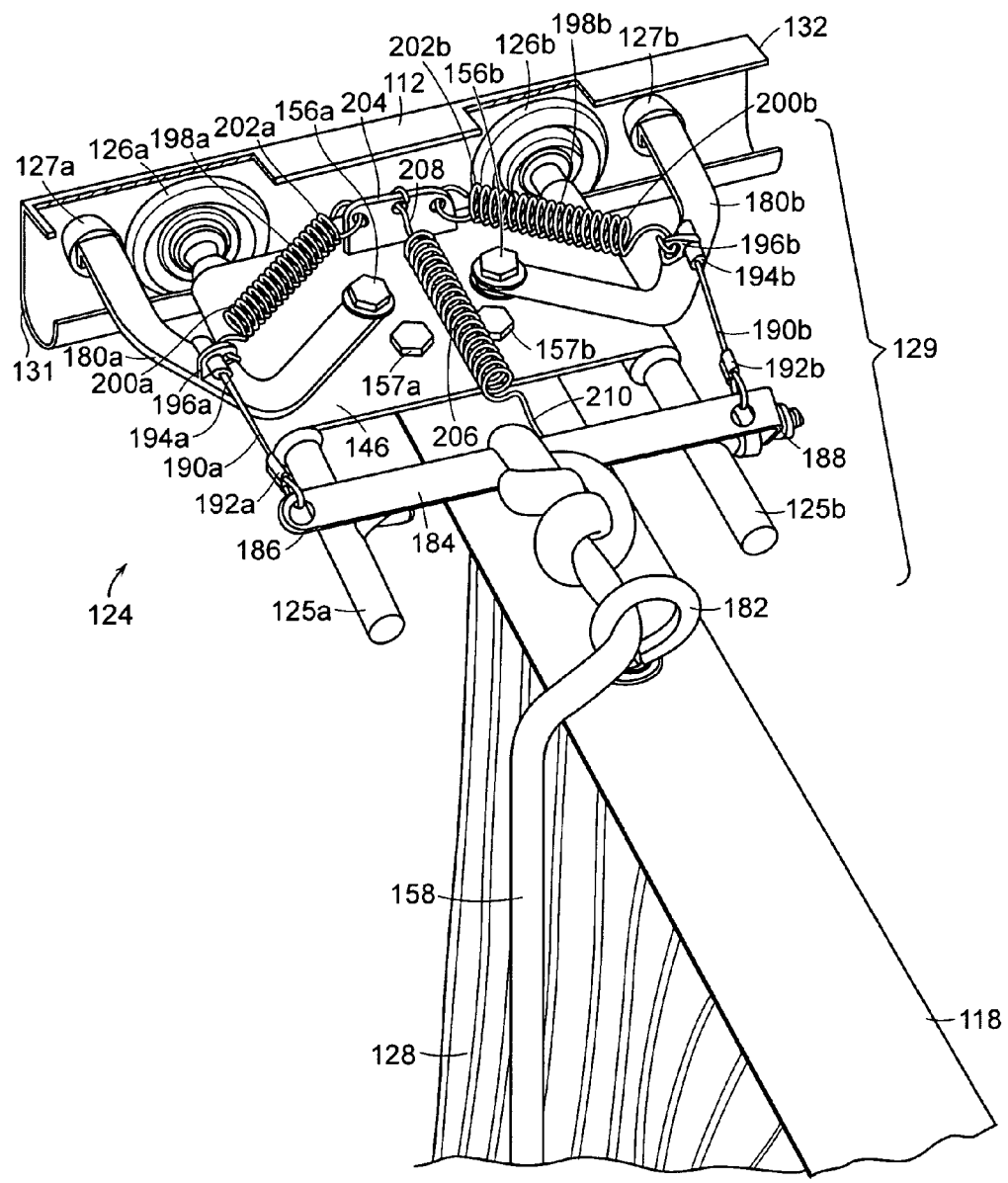
FIG. 6 provides a top perspective view of a releasable locking mechanism according to an embodiment of the invention including a bump stop that applies pressure to the first support.
Figure 7:
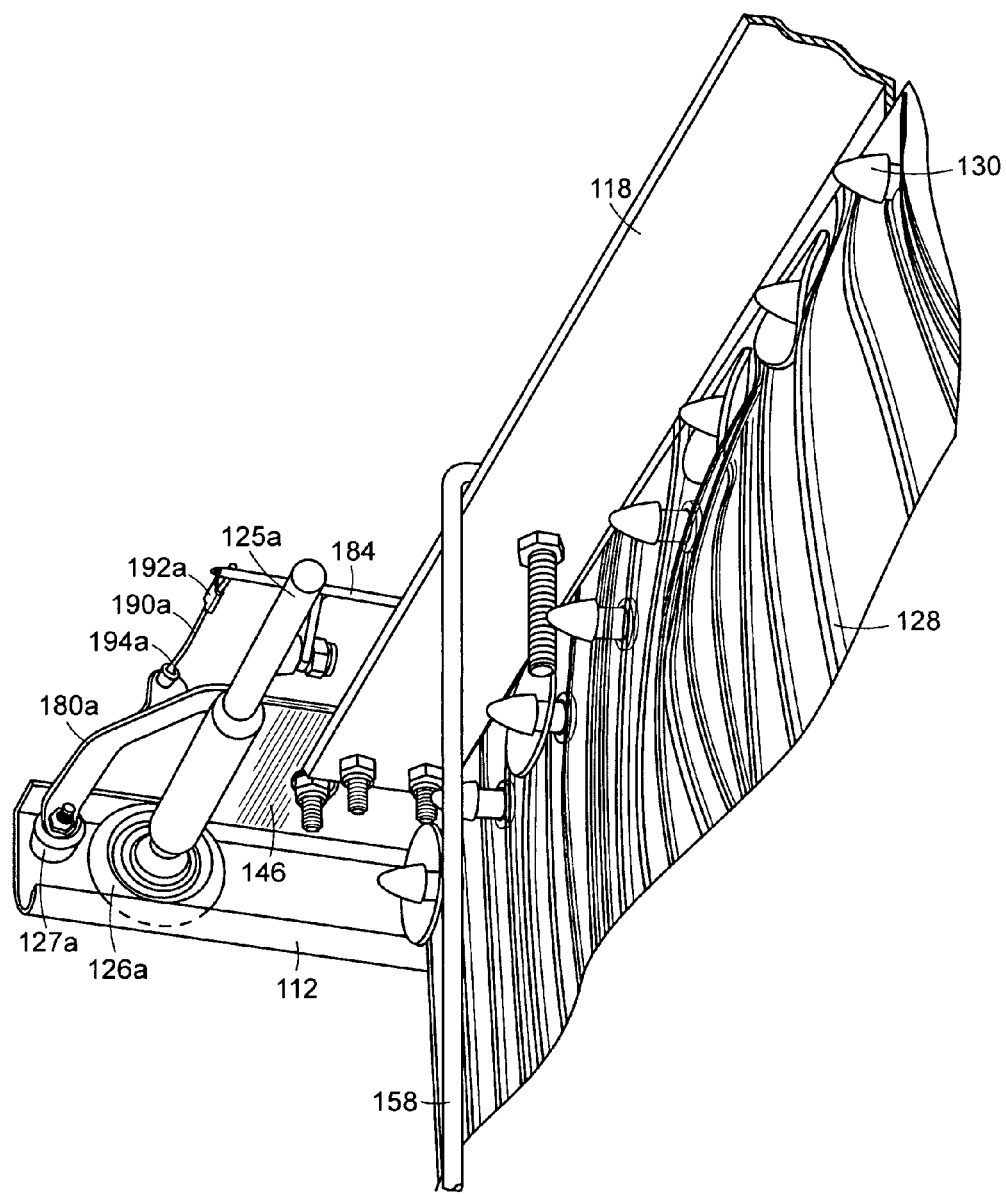
FIG. 7 provides a bottom perspective view of the releasable locking mechanism of FIG. 8.

Referring now to FIGS. 6 and 7, in an embodiment of the invention, the releasable locking mechanism 124 clamps onto the first support 112 and is moveable anywhere along the first support 112 between the ends 131, 132. The releasable locking mechanism 124 is spring-biassed into frictional engagement with the first support member 112. In this embodiment, the releasable locking mechanism 124 comprises a brake mechanism 129, which comprises two rollers 126a, 126b and two bump stops 127a, 127b. The bump stops 127a, 127b comprise a material suitable for frictional engagement with the first support 112 and/or the rollers 126a, 126b, such as rubber or plastic. The bump stops 127a, 127b are attached to curved pivot arms 180a, 180b, which are bolted to base plate 146 by a bolt mechanism 156a, 156b (e.g., comprising a nut, a bolt, and a washer). The base plate 146 is bolted to the transverse bar 118 by fasteners 157a, 157b (e.g., comprising a nut and a bolt). The rollers 126a, 126b are attached to roller axles 125a, 125b which are rotatably connected to base plate 146. A rope 158 is engaged with lever arm 184. Lever arm 184 comprises ends 186, 188, to each of which a cable connector 190a, 190b is attached. One end 192a, 192b of the cable connector 190a, 190b is attached to the lever arm 184 and the other end 194a, 194b of the cable connector 190a, 190b is attached to a spring and cable anchor plate 196, which is disposed on pivot arms 180a, 180b. One end 200a, 200b of a side spring 198a, 198b is attached to the spring and cable anchor plate 196a, 196b and the other end 202a, 202b of the side spring 198a, 198b is attached to a spring anchor plate 204, which is disposed on the base plate 146. In an embodiment, one end 208 of a center spring 206 is attached to the spring and anchor plate 204 and the other end 210 of the center spring 206 is attached to the lever arm 184. The center spring 206 is not required but helps to control movement of the lever arm 184. The releasable locking mechanism 124 is released by pulling rope 158, which passes through eye bolt 182, which is bolted to transverse bar 118. Pulling the rope 158 pulls the lever arm 184 toward the eyebolt 182, thereby preventing the bump stops 127a, 127b from engaging with the first support 112. Conversely, releasing the rope 158 allows the bump stops 127a, 127b to re-engage with the first support 112 when the strip door 128 is placed in the desired location along the first support 112. The releasable locking mechanism 124 may be used on both ends of the transverse bar 118, i.e., may be engaged with both a first support 112 and a second support.

Figure 8:
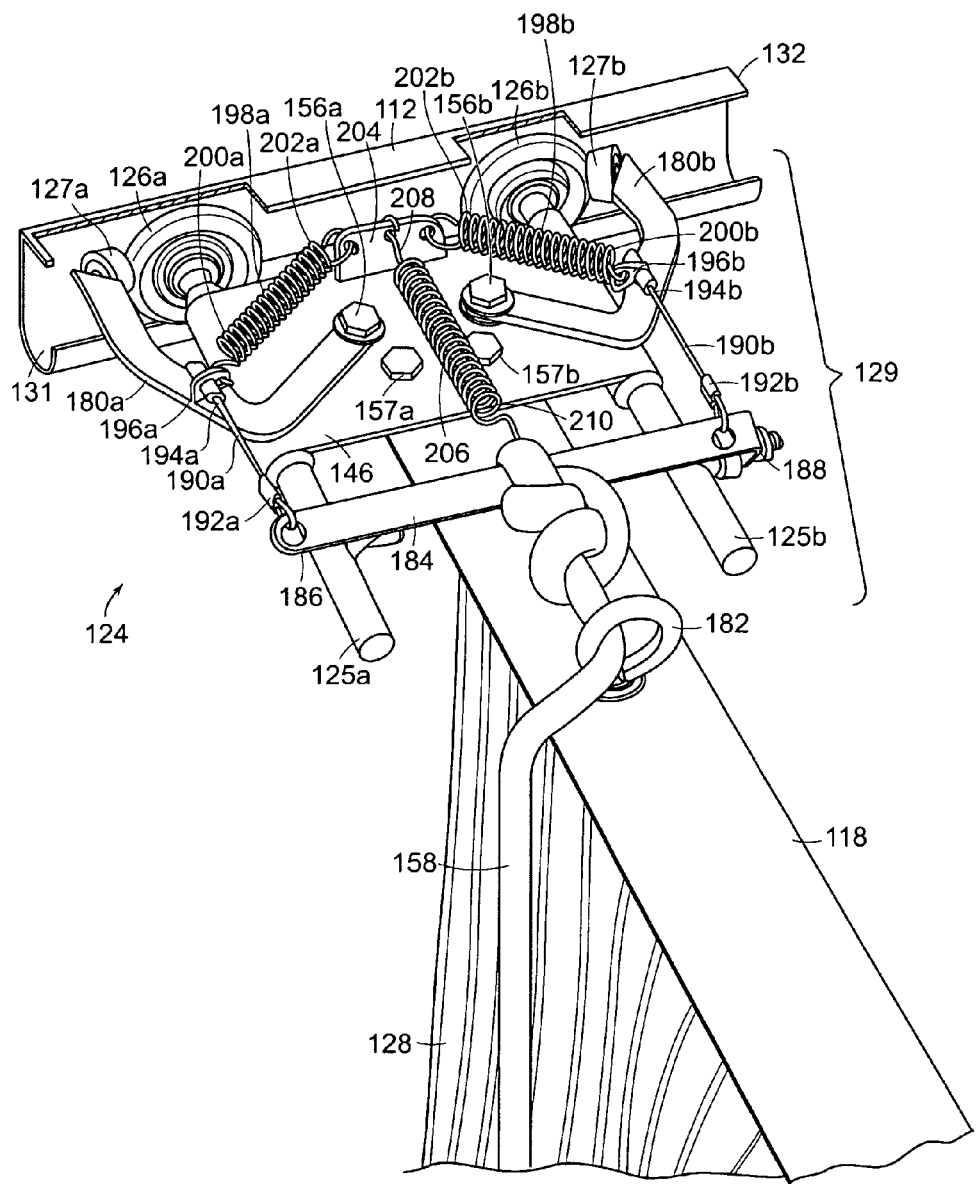
FIG. 8 provides a top perspective view of a releasable locking mechanism according to an embodiment of the invention including a bump stop that applies pressure to the roller and the first support.

In another embodiment, illustrated in FIG. 8, the bump stops 127a, 127b angled such that they engage with both the first support 112 and the rollers 126a, 126b when in the locked position.

Figure 9:
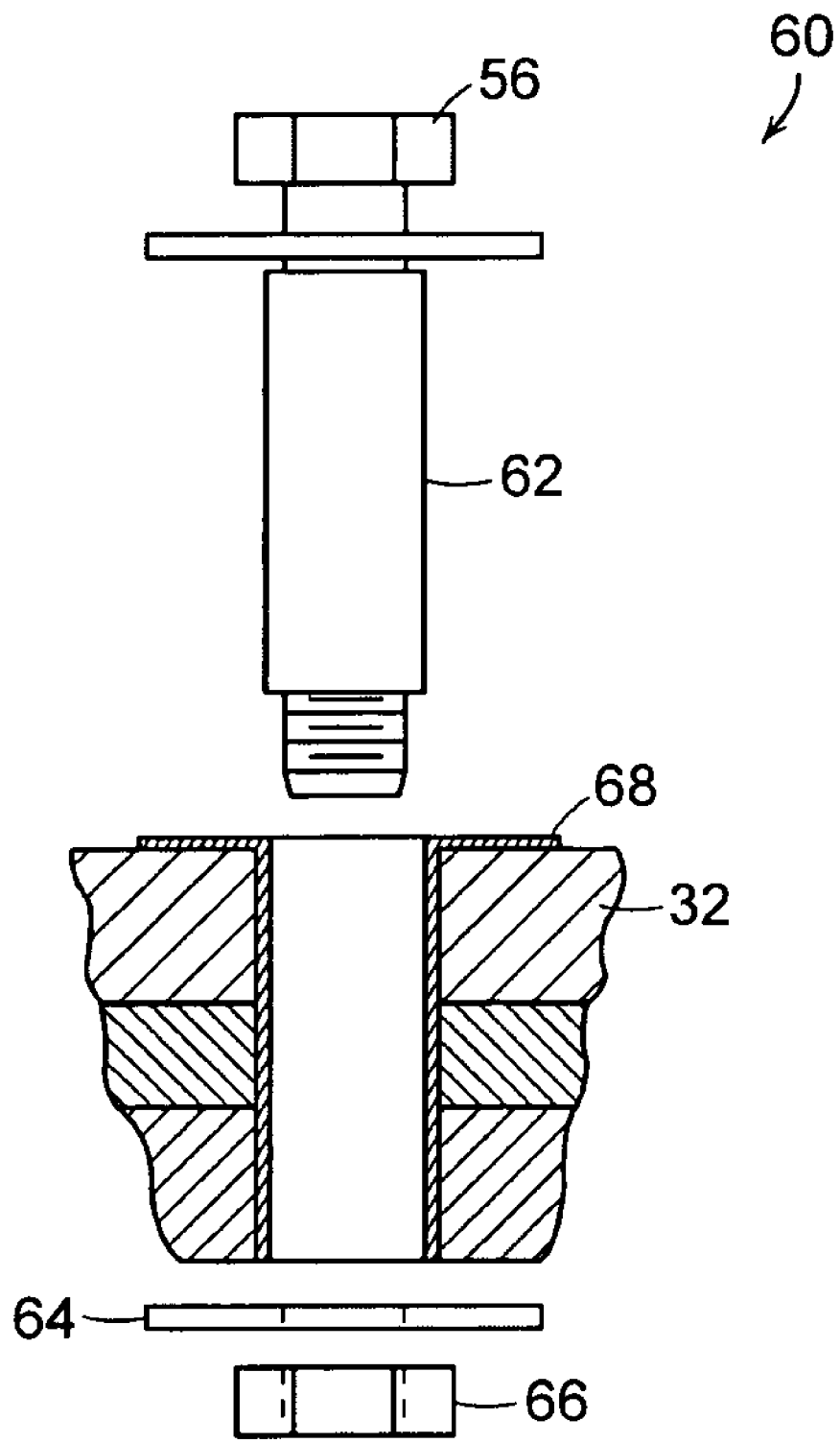
FIG. 9 provides a side view of a pivot mechanism that will allow the strip door of the invention to be moved to a side of the container or truck.

Although not required to release or move the movable strip door suspension system 10 of the invention along the first support 12 and second supports 14, as it is for the system disclosed in U.S. Pat. No. 4,639,031, in some circumstances the operator may desire to move the strip door 16 to one side of the container or vehicle 1. In an embodiment, the strip door 16 can be swung out of the way to simplify loading and unloading, in a similar manner to the "The Swinger" produced by Randall Manufacturing (Elmhurst, Ill.). Referring now to FIG. 9, the releasable locking mechanism 24 may comprise a hinge mechanism 60 that allows the transverse bar 18 to pivot so that it can be moved to one side of the vehicle. In an embodiment, a pivot hinge mechanism 60 may be provided by making bolt 56 about 0.5 to about 2 inches longer to allow for a nylon sleeve 62, such as a DryLin®S anodized aluminum shafting or the like, as sold by Igus, Inc. (East Providence, R.I.), to be inserted through transverse bar 18 and fastened with a washer 64 and lock nut 66. A spanner bushing 68, such as those sold by Refrigeration Hardware Supply Corp. (Sun Valley, Calif.) or Graphite Metallizing Corp. (Yonkers, N.Y.) will be placed into the hole through which the bolt 56 passes in the transverse bar 18, allowing the bolt 56 to rotate within the bushing 68.

Figure 10:
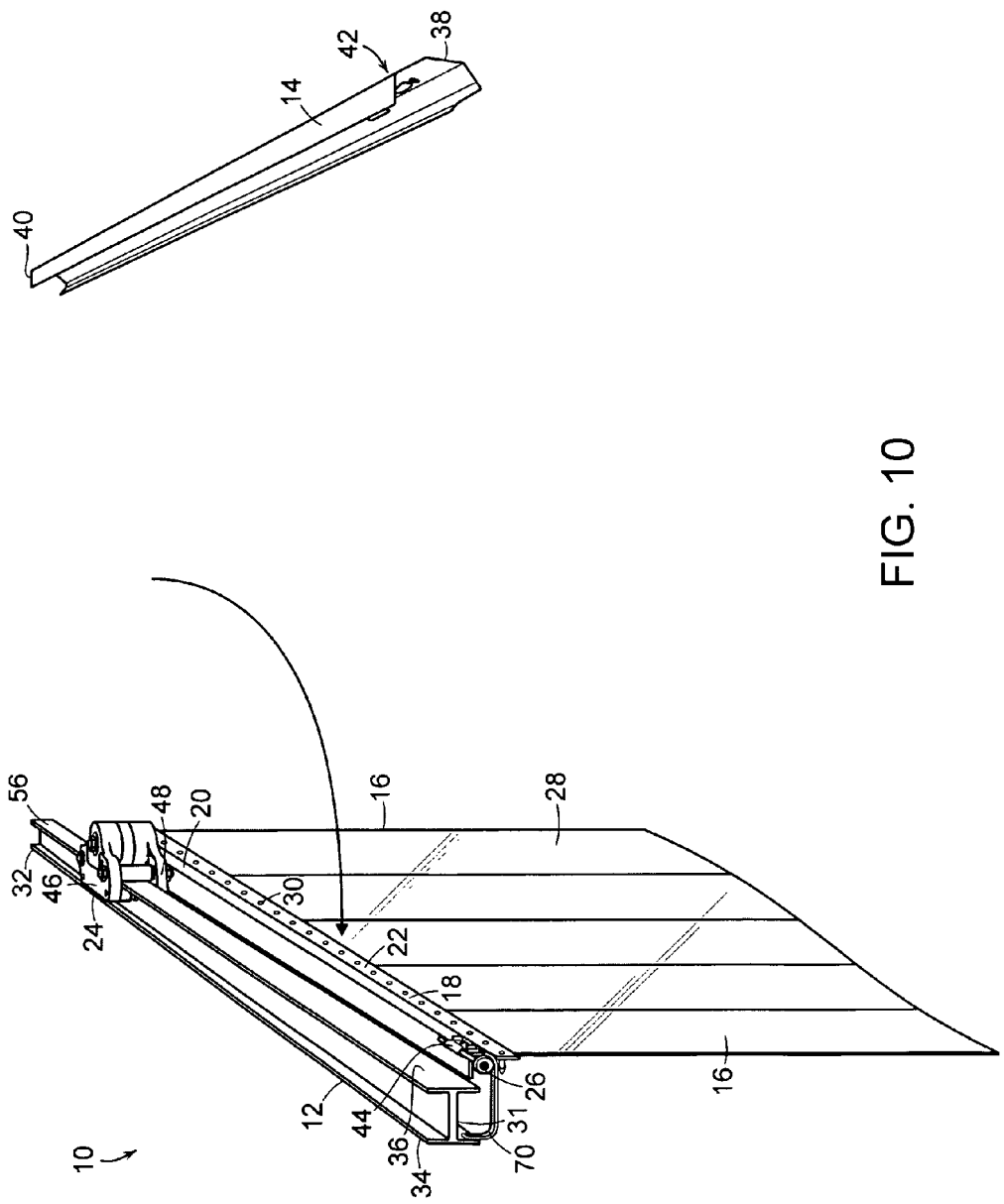
FIG. 10 provides a perspective view of a pivotable strip door suspension system according to an embodiment of the invention.

Referring now to FIG. 10, in an embodiment, the first end 38 of the second support 14 is open such that when the roller 26 reaches the first end 38 it travels off the second support 14 and can pivot relative to bolt 56 to be placed along the first side 2 of the vehicle 1. In another embodiment, an opening can be placed at any point along the length of the second support 14 in order to release and pivot the transverse bar 18 at another location along the second support 14.

In an embodiment, the strip door 16 is pivoted and then secured to a wall of the container or truck, for example, using a wire form hook 70 such as a bent wire hook, S hook, conveyor hook, wire hold down hook, hanging wire form hook, or the like, such as those sold by Marlin Steel Wire Products (Baltimore, Md.) or Keyspan (Fort Lauderdale, Fla.) or other securing device, such as a tie, snap, bolt, bullet fastener, or the like.

One of the many advantages of the invention is that, compared to the device disclosed in U.S. Pat. No. 4,639,031, the transverse bar 18 of the moveable strip door suspension system 10 is closer to the ceiling 6, providing more clearance for loading goods, especially given the angle at which they are loaded from the back of a truck using an angled dockboard. The moveable strip door suspension system 10 can also travel the entire length of a vehicle 1 without requiring the operator to disembark from the vehicle. Further, the instant invention also has the added advantage of providing more usable space for cargo, because it does not include the bar locking assembly of the system disclosed in U.S. Pat. No. 4,639,031.

INCORPORATION BY REFERENCE

The contents of all cited references (including literature references, patents, patent applications, and websites) that may be cited throughout this application are hereby expressly incorporated by reference. The practice of the present invention will employ, unless otherwise indicated, conventional techniques of strip door manufacturing, which are well known in the art.

EQUIVALENTS

The invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims rather than by the foregoing description, and all changes that come within the meaning and range of equivalency of the claims are therefore intended to be embraced herein.

We claim:

1. A movable barrier system extendable between a first side wall and a second side wall, the system comprising:
   a barrier;
   a transverse bar comprising a first end and a second end, the transverse bar engaged with the barrier;
   a first support disposed on a first side wall and a second support disposed on a second side wall, wherein the first end of the transverse bar is moveably engaged with the first support and the second end of the transverse bar is moveably engaged with the second support; and a releasable locking mechanism engaged with the first end of the transverse bar, said locking mechanism including at least one roller adapted to move along the first support, said locking mechanism also including at least one stop member movable into a locking position in which the at least once stop member frictionally engages said at least one roller and said first support to releasably lock said transverse bar relative to the first support, said locking mechanism being capable of releasably locking said first support at substantially any point along said first support, the locking mechanism enabling said transverse bar to be moved relative to the first and second support without separation of said transverse bar from said first or second support.

2. The system according to claim 1, wherein the barrier is a thermal barrier.

3. The system according to claim 1, wherein the barrier is an insect barrier.

4. The system according to claim 1, wherein the barrier is formed from a plurality of strips.

5. The system according to claim 4, wherein the strips comprise thermoplastic sheeting.

6. The system according to claim 4, wherein the strips comprise a mesh.

7. The system according to claim 1, wherein the barrier comprises a material selected from the group consisting of poly vinyl chloride, vinyl, and vinyl coated fabric.

8. The system according to claim 2, wherein the thermal barrier comprises an insulating fabric.

9. The system according to claim 1, wherein the first support comprises an I rail extending along the first side wall.

10. The system according to claim 1, wherein the first support comprises a T rail extending along the first side wall.

11. The system according to claim 1, wherein the second support comprises a roller track extending along the second side wall.

12. The system according to claim 1, wherein the second end of the transverse bar is engaged with a roller assembly that engages with the roller track.

13. The system according to claim 1, wherein the second end of the transverse bar can disengage from the roller track.

14. The system according to claim 12, wherein the roller assembly comprises at least one wheel.

15. The system according to claim 12, wherein the transverse bar can pivot to be moved to be against the first side wall.

16. The system according to claim 1, wherein the locking mechanism comprises a moving member for moving the locking mechanism.

17. The system according to claim 1, wherein the system is attached to the inside of a vehicle selected from the group consisting of a Truckenbrodt, a trailer, an aircraft, a cart, a van, and a train car.

18. The system according to claim 1, wherein the system is attached to the inside of a room or container.

19. The system according to claim 1, wherein the releasable locking mechanism is spring-biased toward the locking position.

20. The system according to claim 1, wherein the stop member comprises rubber or plastic.

* * * * *